United States Patent [19]

Bone

[11] E Re. 29,819

[45] Reissued * Oct. 31, 1978

[54] FASTENER ATTACHMENT SYSTEM NEEDLE CONSTRUCTIONS

[75] Inventor: Arnold R. Bone, Needham, Mass.

[73] Assignee: Dennison Manufacturing Company, Framingham, Mass.

[ * ] Notice: The portion of the term of this patent subsequent to Apr. 25, 1989, has been disclaimed.

[21] Appl. No.: 817,944

[22] Filed: Jul. 22, 1977

Related U.S. Patent Documents

Reissue of:

[64] Patent No.: 3,895,753
Issued: Jul. 22, 1975
Appl. No.: 382,963
Filed: Jul. 26, 1973

U.S. Applications:

[63] Continuation of Ser. No. 158,438, Jun. 30, 1971, abandoned, which is a continuation-in-part of Ser. No. 39,564, Apr. 17, 1970, Pat. No. 3,659,769.

[51] Int. Cl.[2] ..... B65C 7/00
[52] U.S. Cl. ..... 227/67; 227/68
[58] Field of Search ..... 227/64, 67, 68; 30/109, 30/115, 351, 357

[56] References Cited

U.S. PATENT DOCUMENTS

| | | | |
|---|---|---|---|
| 556,615 | 3/1896 | Campbell | 30/357 |
| 2,069,878 | 2/1937 | Flood | 227/67 |
| 2,952,851 | 9/1960 | Epstein | 227/68 |
| 3,103,666 | 9/1963 | Bone | 227/67 |
| 3,470,834 | 10/1969 | Bone | 227/95 |
| 3,650,452 | 3/1972 | Finke | 227/67 |
| 3,659,769 | 5/1972 | Bone | 227/67 |

*Primary Examiner*—Granville Y. Custer, Jr.
*Attorney, Agent, or Firm*—George E. Kersey

[57] ABSTRACT

A needle tube or the like useful in dispensing fastener attachment members, the needle including a tip, a central portion and a mounting portion, the mounting portion having a hollow rearward end in which there is provided a knife edge extending inwardly towards the tip, a first feed slot at substantially ninety degrees to the knife edge and a second slot for feeding fastener attachment members through the needle, the second slot substantially ninety degrees to the first slot. In one embodiment of the invention the mounting portion comprises a plastic shank in which there is mounted a needle core which includes the aforementioned knife edge.

30 Claims, 22 Drawing Figures

FASTENER ATTACHMENT SYSTEM NEEDLE CONSTRUCTIONS

Matter enclosed in heavy brackets [ ] appears in the original patent but forms no part of this reissue specification; matter printed in italics indicates the additions made by reissue.

This is a continuation of U.S. application Ser. No. 158,438 filed June 30, 1971, now abandoned, which was filed as a continuation in part of application Ser. No. 39,564 filed Apr. 17, 1970, now U.S. Pat. No. 3,659,769.

BACKGROUND OF THE INVENTION

This invention relates to devices for inserting fastener attachment members into or through articles or the like and is more particularly related to new and improved needle constructions useful in fastener attachment devices.

As used herein the term needle is meant to include tubes or the like constructed in accordance with the description provided herein.

Devices for inserting fastener attachment members as well as the fastener attachment members, barlock members or the like are illustrated in U.S. Pat. Nos. 3,103,666, 3,444,597 and 3,470,834. These devices find utility in the attaching of tags to merchandise, coupling layers of material together and fastening buttons to clothing etc.

In the past as shown by U.S. Pat. No. 3,103,666 the needle was merely used for conveying a fastener attachment member to insert it into material and performed no cutting function. Subsequently, the needle shown in U.S. Pat. No. 3,470,834 was developed and did incorporate a knife in the patent which extended outwardly therefrom from the rear thereof. In some of the latter devices constructed as shown in the patent a V-shaped notch was also provided at the rear of the knife. But with this type of device construction the needle was not replaceable, if broken, or if the knife edge wore down after extensive use, once placed into the housing since the casing was sealed together in order to produce an inexpensive device. In addition, the needle would be most difficult to replace in any event since the parts of the device had to be disassembled in order to insert the needle in place.

The use of the above identified needle also suffered from some major disadvantages in comparison with the needles to be described herein in that its use necessitated the construction of special guide slots in the housing to retain the ears in place as well as specially shaped guide slots in the housing to facilitate the entry of the fastener attachment member in front of and in proper alignment with the needle knife edge and slot. Further, the above needle also did not have the rigidity desired to maintain its shape, when inserted into heavy material, because of the manner in which it was supported. The needle when inserted into heavy material tends to bend at the point where the laterial ears are joined to the central portion of the needle, which results in the destruction of the device.

Accordingly, to overcome the aforementioned disadvantages, this invention has provided new and improved needle constructions which can be easily replaced if worn or broken and which avoids the necessity of specially shaped housing mounting structures and housing guides to insure proper location of the fastener attachment member.

SUMMARY OF THE INVENTION

In a first embodiment a unitary needle is constructed which includes in a mounting portion thereof a knife edge, a guide slot to facilitate entry of a fastener attachment member therein and a passageway slot for the movement of a fastener attachment member therethrough upon being separated from its carrier.

In a second embodiment disclosed herein, a two piece needle construction is provided with a needle core being of metal and the shank therefore being of plastic which locks the needle core in place, the needle core being provided with a substantially V-shaped knife and the shank being provided with a guide slot, a passageway slot, and a portion removed to permit exposure of the knife edge. In addition, between the two slots a shortened finger is provided to prevent jamming of the fastener attachment members as they enter the guide slots. With this second embodiment, which is the preferred embodiment, this invention provides a needle construction which can be fabricated at considerably less than the cost of the first embodiment which requires expensive machining to fabricate.

DESCRIPTION OF THE EMBODIMENTS OF THE INVENTION

Reference should now be had to FIGS. 1-7 for a brief description of a device adapted to use the new and improved needles of this invention.

Figure 1:
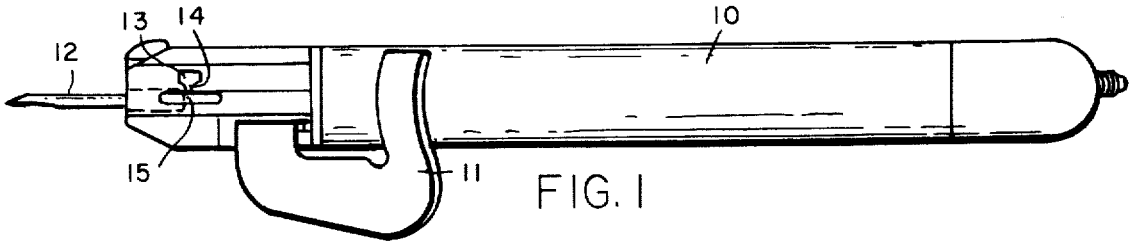
FIG. 1 is a top view of a fastener attachment device utilizing the improved needles of this invention.

In FIG. 1, the device is shown comprising an outer housing 10 in which there is mounted a hand operable lever 11 for controlling the operation of the device. At the front of the device there is shown a needle 12 according to the invention mounted in the nose of the device.

Figure 21:
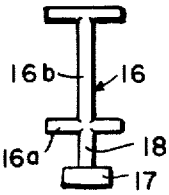
FIG. 21 shows an end view of an attachment member coupled to a carrier.
Figure 7:
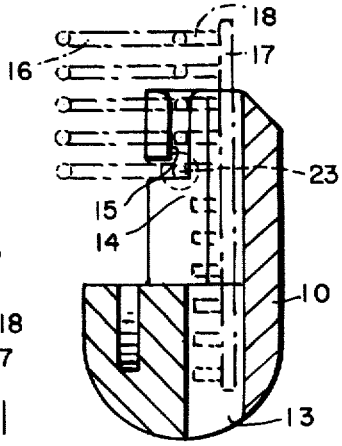
FIG. 7 is a sectional view taken along line 7—7 of FIG. 2.
Figure 8:
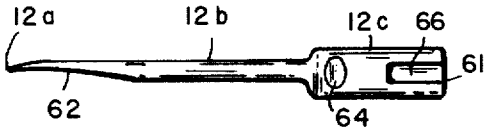
FIG. 8 is a top view of the first embodiment of a needle in accordance with this invention.
Figure 9:
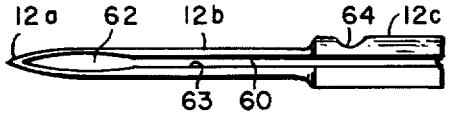
FIG. 9 is a side view of the needle shown in FIG. 8.
Figure 10:
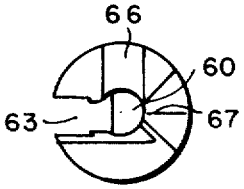
FIG. 10 is a rear view of the needle shown in FIG. 8.
Figure 11:
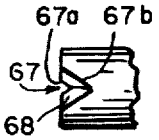
FIG. 11 is a side view of the rear cutting edge of the needle.

In FIG. 1, there are shown guide slots 13, 14 and 15 formed in the housing to permit the feeding of fastener attachment members 16 coupled to a carrier or bar 17 by connecting or neck members as shown in FIGS. 7 and 21. The slot 13 is for the feeding of the carrier 17, the slot 14 is for the feeding of the connecting members 18 and the slot 15 is for the feeding of the fastener attachment members 16.

Figure 2:
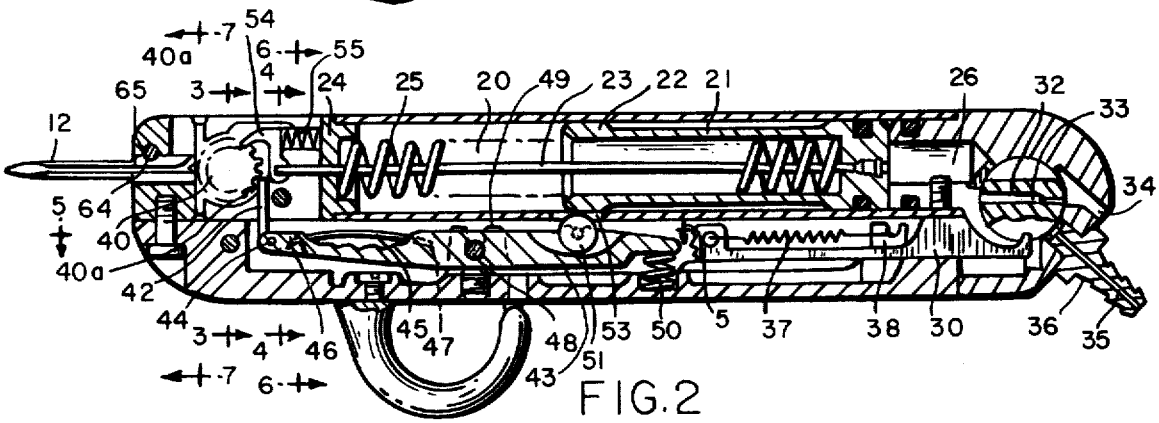
FIG. 2 is a sectional view of FIG. 1 to show the operating parts of the device.
Figure 3:
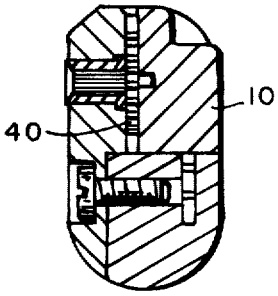
FIG. 3 is a sectional view taken along line 3—3 of FIG. 2.
Figure 2A:
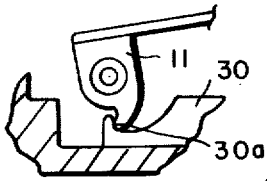
FIG. 2A is a view showing a portion of the mechanism for operating the fastener attachment device.
Figure 4:
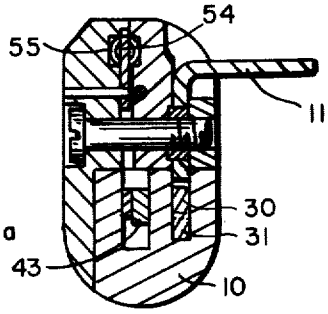
FIG. 4 is a sectional view taken along line 4—4 of FIG. 2.
Figure 5:
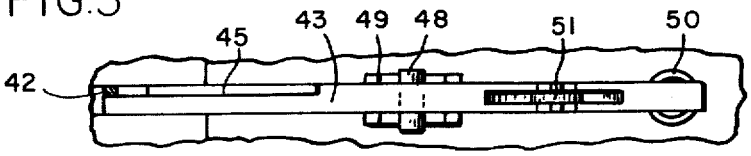
FIG. 5 is a sectional view taken along line 5—5 of FIG. 2.
Figure 6:
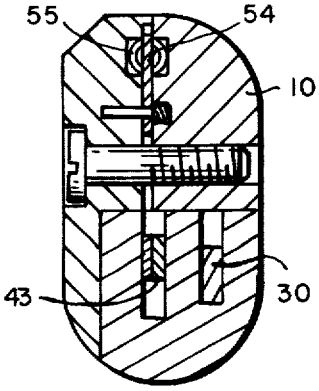
FIG. 6 is a sectional view taken along line 6—6 of FIG. 2.

In FIG. 2, there is shown a cylinder 20 in which there is positioned a piston 21 adapted for movement back and forth therein. The piston 21 includes a camming surface 22 which cooperates with an indexing mechanism shown in FIG. 2 as will be described. The piston supports a plunger 23 which is adapted to penetrate through a hole formed in member 24 at the front of the cylinder 20. The plunger is adapted to push a fastener attachment or bar lock member 16 out of the front of the device through needle 12 as disclosed in the patents cited above. In order to maintain the piston 20 in the rearward position as shown in FIG. 2, a spring 25 is provided. The piston 21 is moved forward by filling a chamber 26 at the rear of the piston 21 with fluid (e.g. air) under pressure.

The flow of air into the chamber is controlled by the lever 11 which controls a slidable rod 30 movable in a slot 31 formed in the housing 10. The rod 30 is coupled at one end 30a to the lever 11 and at the end to a rotary member 32 of a rotary valve. The rotary member comprises a passageway 33 which is adapted to be rotated between an air vent 34, where it is normally positioned when the lever 11 has been released and a passageway 35. The passageway 35 forms part of a connector 36 which is adapted to be coupled to a source of fluid, in this case air under pressure. The member 30 is urged rearwardly by a spring 37 coupled to it and a member 38 coupled to the housing interior.

At 40 there is shown an indexing wheel or gear having teeth 40a for engaging the connecting members 18 in order to feed the fastener attachment members 18 one at a time at the rear of the needle and in front of the plunger 23 as shown in FIGS. 2 and 7.

In order to rotate the indexing wheel (counterclockwise) to feed the fastener attachment members, there is provided a feed pawl 42 which is rotatably coupled to a lever 43 by a pin 44. A flat spring 45 is positioned in a slot 46 of the feed pawl 42 and is supported at its other end by a slot 47 formed in the lever. The spring 45 urges the feed pawl 42 in a counterclockwise direction. The lever 43 is supported by a pin 48 on a pivot support 49 coupled to the housing 10 and is urged counterclockwise by a spring 50.

The lever 43 is rocked back and forth by the action of a cam follower or roller 51 which is adapted to engage the cam surface 2 of the piston through a cutout 53 formed in the bottom wall of the cylinder 20.

Thus as the piston is driven forward, the lever will rotate counterclockwise to move the feed pawl 42 downwardly so that it is in position to engage the next tooth of the wheel 40.

On the rearward movement of the piston, the cam follower 51 engages the cam surface 22 and causes the feed pawl to move clockwise to rotate the feed wheel 40 counterclockwise. In order to prevent the feed wheel from moving clockwise there is provided a rotatable detent 54 which is urged counterclockwise by a spring 55 supported in a cavity formed in the housing. For further details of the operation of the device of FIGS. 1-7, reference may be had to the parent application Ser. No. 29,564 of this application.

Reference should now be had to FIGS. 8-11 for a description of one of the new needle constructions according to this invention. The needle 12 comprises a tip portion 12a, a central portion 12b and a mounting portion 12c. In this construction the needle is fabricated completely out of metal and is machined to the desired shape. The central portion and mounting portions include a central bore, the bore extending from the end 61 of the mounting portion 12c through the central portion where it opens up at 62. The bore includes a first slot 63 at the top thereof. The bore 60 provides a guide for the end member 16a of the attachment member 16 (see FIG. 21) and the slot permits the central member 16b of the attachment member to extend therethrough when the fastener attachment member is driven through the needle 12.

The mounting portion includes a locking notch 64 which permits the needle to be held in place by a cam lock 65 in FIG. 2. The mounting portion also includes a second slot 66 which extends from the end 61 to a point in front of the locking notch 64. The second slot is positioned to permit one half of the fastener attachment end member 16a to be inserted into the needle prior to the fastener attachment member being forced through the needle.

The mounting portion further includes a knife 67 which extends inwardly from the end 61 towards the tip 12a. The knife is wider at the end 61 and narrows inwardly in the shape of a V from the end 61. The knife 67 is beveled at 68 and comprises two V-shaped edges, an inner edge 67a and an outer edge 67b. Thus the beveled face of the knife faces outwardly. The knife is positioned at substantially 90° to the second slot 66, and 180° to the first slot 63 and the second slot is positioned at substantially 90° with respect to the first slot. Thus as the plunger 23 of the device forces the attachment members 16 through the needle, the connecting member 18 will engage the knife cutting edge 67a and be severed from the carrier 17.

Reference should now be had to FIGS. 12-19 for a description of the preferred needle construction according to this invention. The needle comprises two separate members, a needle core 80 preferably of metal and a needle shank or mounting portion 81 preferably of a rigid plastic which are joined together. The needle core forms a central portion 83 of the needle as well as a tip 84 of the needle.

Figure 12:
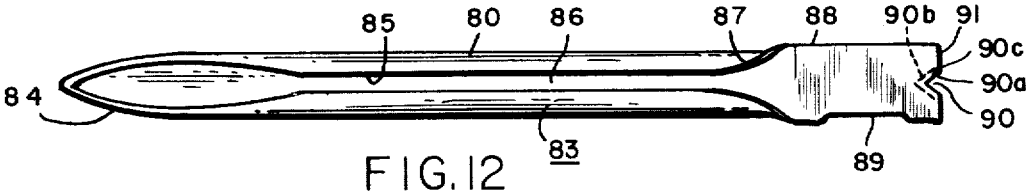
FIG. 12 is a side view of a needle core of the second embodiment of the invention.
Figure 13:
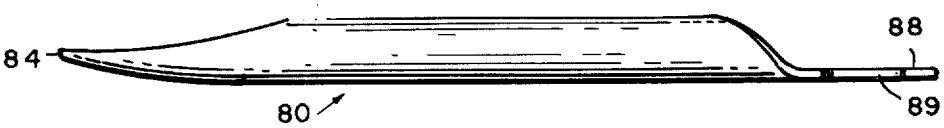
FIG. 13 is a side view of the needle core of FIG. 12.
Figure 16:
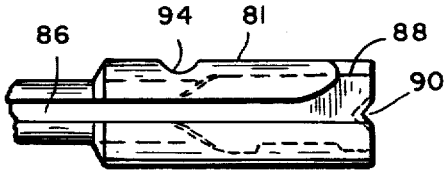
FIG. 16 is a side view of the needle shown in FIG. 15.
Figure 17:
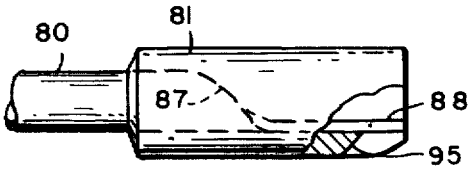
FIG. 17 is a bottom view with parts broken away of the needle shown in FIG. 15.
Figure 15:
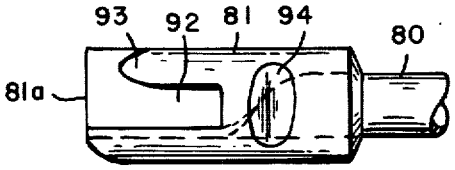
FIG. 15 is a top view of the needle core of the invention locked into the needle shank of this invention.
Figure 14:
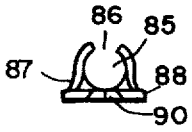
FIG. 14 is a rear view of the needle core of FIG. 12.
Figure 18:
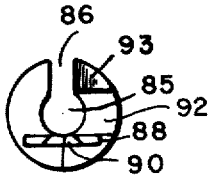
FIG. 18 is a rear view of the needle shown in FIG. 15.

The needle core is shaped from flat sheet metal stock using conventional cold working techniques to form a core illustrated in FIGS. 12-14. The core is provided with a central bore 85 and a first slot 86 which opens into the bore 85. The bore provides for the passage of the fastener attachment end 16a whereas the first slot 86 facilitates the travel of the member 16b therethrough.

The bore and slot are preferably formed by cold working the metal stock to leave a shoulder 87 to aide in mechanically locking the core and shank together. The core is also provided with a flat tail portion 88 which has a keyway 89 and a substantially V-shaped knife 90 extending from the end 91 thereof. The keyway cooperates with the shank to hold the core in place securely within the shank.

Figure 19:
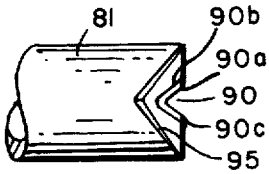
FIG. 19 is a side view of the needle of FIG. 15 opposite to the side view.

The knife 90, as does knife 67 includes two edges 90a and 90b with a beveled surface 90c therebetween facing outwardly, as seen in FIG. 19. The knife 90 is formed by conventional shearing techniques to form the cutting edge.

The shank 81 also includes a bore and slot which are in alignment with the bore and slot of the needle core, and are accordingly given the same numbers for convenience.

The bore and slot of the shank perform the same function as the bore and slot of the core. The shank 81 further has a second slot 92 separated from the first slot 86 by a finger 93. The second slot acts in the same manner as slot 66 of FIG. 8–11. The finger 93 is provided in its shortened form to prevent jamming of the fastener attachment members as they are fed into the needle. As an important aspect of this invention, when the shank is of plastic, it is important (although not absolutely necessary) to provide a shaped finger which does not extend to the end 81a of the shank to insure that the finger, which is somewhat flexible because it is of plastic, does not jam the feeding of the attachment members. It has been found that without the finger being cutback the attachment member portion 16b has a tendency to end up in the second slot, and not the first slot of the needle which causes jamming of the device.

Thus the shortened finger 93 provides a funnel or chute for the movement of the members 16b into position to feed through the needle. It should be noted that the core end 91 and the shank end 81a preferably coincide or start from the same point.

As another aspect of this invention, the shank is formed so that the knife edges are exposed as shown in FIG. 19. This may be accomplished by molding; removing or cutting away the plastic leaving a surface at 95.

The shank 81 is also provided with a locking notch 94 to securely lock and position the needle within the nose of the device as shown in FIG. 2.

Figure 20:
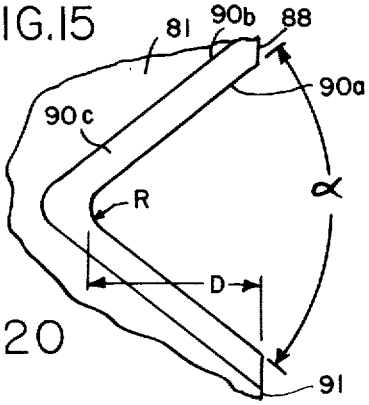
FIG. 20 is an enlarged view showing the shape of the knife portion of the needle.

It has been found that to cleanly cut certain types of material such as polyurethane fastener attachment members 16 without leaving objectionable connecting member studs 18 attached to the attachment members 16, it is most preferable that the cutting edges 67a and 67b and 90a and 90b be shaped as shown in FIG. 20 so that they have a rounded cutting surface at the bottom of the V.

It has also been found that with this V-configuration, the arc defined by the radius R of the cutting surface 67a and 90a and secondary surfaces 67b and 90b should preferably have an arc defined by a radius of between .005 – .010 inches. It is also most important in getting the clean cut that the depth D from end 91 to the cutting surface edges 67a or 90a preferably be between .015 to .025 inches for connecting necks 18 which have a diameter of about 1/32 of an inch.

It has also been found that to obtain the best results, the angles $\alpha$ of the legs of the V cutting edges should be between 60° to 95° and most preferably 70° to 90°.

The composite needle shown in FIGS. 12–19 is preferably constructed using conventional injection molding techniques using an outer mold and a mold insert fitted into a fabricated core when in the configuration shown in FIG. 12. Plastics such as Delrin (A Dupont Acetal Resin) or Nylon filled with glass fibers may be used to provide a shank which is substantially rigid and hard enough to be held in the device and to mechanically lock the core 80 in place within it. As will be seen in FIGS. 16 and 17, the shank is molded such that the plastic flows about the outside of the shoulder 87 and into the keyway 89 to securely hold the core in place. It should be understood that the shank could act as the keyway in place of the core keyway 89, if the core portion 88 was formed with a key.

I claim:

1. A needle comprising a tip, a central portion and a mounting portion, a first slot and a bore extending from the rear of the mounting portion into the central portion, a second slot in the mounting portion offset from the first slot and which extends from the rear of the mounting portion partially to the front portion of the mounting portion closest to the central portion, and a knife provided in the mounting portion opposite the first slot and offset from the second slot, [said knife comprising cutting edge portions shaped to form a 'V' with the bottom of the 'V' pointing towards the tip and cutting edge portions spaced apart at the rear of the mounting portion, and the bottom of the 'V' extending partially towards said central less than the distance said second slot extends towards said central portion ].

2. A needle for dispensing fastener attachment members comprising a needle core having a tip, a central portion and a flat tail portion having a rearward end, a first slot and bore formed in the central portion of th core for permitting th travel of portions of fastener attachment members therethrough, and a rigid plastic shank surrounding a portion of said core and having a first slot in line with said first slot of said core and a bore in line with the bore of said core, the plastic shank surrounding a portion of the core central portion and at least a portion of said tail portion [said central portion of the core having a flared shoulder defining an entry way into the slot of the central portion, and said flared shoulder encapsulated by said rigid plastic to lock the core in the rigid plastic shank ].

3. A needle according to claim 2 in which the tail is provided with a cutting knife with cutting edge portions forming a 'V'.

4. A needle according to claim 3 in which the shank is formed with a second slot which extends from the rearward end of the shank partway towards the front of the shank for permitting a portion of the fastener attachment end members to be guided into the bores.

5. The needle of claim 3 in which a portion of the plastic shank is shaped to expose the knife.

6. A needle according to claim 3, in which the 'V' shaped cutting knife has a curved edge portion at the bottom of the 'V'.

7. A needle according to claim 6 in which the curved edge portion of the 'V' has an arc defined by a radius between .005 and .010 inches.

8. A needle according to claim 7 in which the knife 'V' extends inwardly from the rearward end of the tail .015 to .025 inches and werein the angle between the edge portions of the 'V' is between 60° to 95°.

9. The needle of claim 6 in which a portion of the plastic shank is shaped to expose the knife.

10. A needle for dispensing fastner attachment members comprising a needle core having a tip central portion and flat tail portion having a rearward end, a first slot and bore formed in the central portion of the core for permitting the travel of fastener attachment members therethrough and a rigid plastic shank surrounding a portion of the core and having a first slot in line with said first slot of said core and a bore in line with the bore of said core central portion, the plastic shank surrounding a portion of the core, said needle having a shaped cutting surface defining a knife which extends toward said tip, said shank having a second slot which extends from the rearward end thereof partway towards the front of the shank for permitting a portion of the fastener attachment end member to be guided into the bores in which a finger separates the first and second slots of the shank and in which the finger extends only partway towards the rearward end of the shank.

11. A needle according to claim 10 in which said core includes a shoulder and in which the shank engages said shoulder of said core to lock the core in the shank.

12. A needle according to claim 11 in which the tail has a keyway and the interior of the shank extends into the keyway and engages said keyway to mechanically hold the tail into the shank.

13. A needle according to claim 12 in which the shaped cutting surface is in the form of a 'V' having a curved bottom.

14. A needle according to claim 13 in which the curved bottom has an arc defined by a radius of between .005 and .010 inches.

15. A needle according to claim 14 in which the edge of the shaped cutting surface extends inwardly from the rearward end of the tail .015 to .035 inches and wherein the angle between the legs of the 'V' is between 60° to 95°.

16. A needle according to claim 13 in which a portion of the shank is shaped to expose the cutting surface of the knife.

17. A needle comprising a tip, a central portion and a mounting portion, a first slot and a bore provided in the central portion, a bore and first slot provided in the mounting portion and communicating with the bore and the first slot of the central portion, the improvement of a knife extending along the side of the mounting portion, the knife having at least one 'V' shaped cutting edge with the bottom of the 'V' pointing towards said tip, and the open part of the 'V' defined by the rear of the mounting portion, said 'V' shaped cutting edge having a curved portion at the bottom of the 'V', said mounting portion is provided with a second slot extending from the rearward end thereof towards the front of the mounting portion to guide a portion of an attachment member into the bore, in which a finger separates the first and second slots of the mounting portion and in which the finger extends only partway towards the rearward end of the mounting portion.

18. A needle dispensing fastener attachment members comprising a metal portion including a tip, a central portion and a flat tail portion having a rearward end, said central portion having a bore opening into a slot for permitting the travel of portions of fastener attachment members therethrough, and a [ridig] *rigid* plastic shank having a slot in line with the slot of the central portion and a bore in line with the bore of the central portion for permitting the travel of portions of fastener attachment members therethrough, said rigid plastic shank extending about an engaging at least a portion of said central portion and said tail portion and said slot of the shank is positioned above a portion of the slot of the central portion.

19. The needle of claim 18 in which the portion of the central portion closest to the tail portion has a flared shouler at the entryway and in which the plastic shank encapsulates the flared shoulder to lock the metal portion of the needle within the plastic shank.

20. The needle of claim 19 in which a flat tail portion is provided with a keyway and in which the plastic shank extends into and encapsulates the keyway to lock the metal portion in the plastic shank.

21. The needle of claim 18 in which the flat tail portion is partially exposed in the shank and may be observed by viewing through the slot of the shank and is an extension of the metal core surface.

22. The needle of claim 21 in which the plastic shank has a second slot at substantially right angles to the first slot.

23. The needle of claim 18 in which the flat tail has a knife and a portion of the rigid plastic is removed to expose the knife.

24. The needle of claim 23 in which the knife is 'V' shaped.

25. The needle of claim 24 in which the bottom of the 'V' is rounded.

*26. A needle for dispensing attachments comprising*

*a body having a mounting tubular portion which is proportioned for the removable insertion of the needle into a dispensing device,*

*said needle including a central bore extending through said body and*

*an elongated slot communicating with said central bore and extending along said body,*

*said needle being provided with a cutting edge at least over a part of its mounting portion,*

*whereby the removability of said needle permits a worn needle and a dull point to be removed from the dispensing device and replaced by a substitute needle with a sharp point.*

*27. A needle for dispensing attachments comprising*

*A body having a mounting portion including a shank of rigid plastic which is proportioned for the removable insertion of the needle into a dispensing device,*

*said needle including a central bore extending through said body and*

*an elongated slot communicating with said central bore and extending along said body,*

*whereby the removability of said needle permits a worn needle with a dull point to be removed from the dispensing device and replaced by a substitute needle with a sharp point.*

*28. A needle as defined in claim 27 wherein said slot extends longitudinally through said shank.*

*29. A needle as defined in claim 28 wherein said shank includes a second slot which extends longitudinally and partially therealong.*

*30. A needle as defined in claim 29 wherein said shank includes a shortened finger between the two slots, thereby to curtail the jamming of fastener attachment members as they enter the first slot.*

* * * * *